United States Patent
Zhao et al.

(10) Patent No.: US 8,914,893 B2
(45) Date of Patent: Dec. 16, 2014

(54) METHOD AND SYSTEM FOR MOBILE INFORMATION SECURITY PROTECTION

(75) Inventors: Shen Zhao, Beijing (CN); Chen Wang, Beijing (CN); Yu Lin, Beijing (CN); Shihong Zou, Beijing (CN)

(73) Assignee: Netqin Mobile (Beijing) Co. Ltd., Beijing (CN)

( * ) Notice: Subject to any disclaimer, the term of this patent is extended or adjusted under 35 U.S.C. 154(b) by 0 days.

(21) Appl. No.: 13/217,022

(22) Filed: Aug. 24, 2011

(65) Prior Publication Data
US 2013/0055405 A1 Feb. 28, 2013

(51) Int. Cl.
G06F 21/00 (2013.01)
G06F 17/30 (2006.01)
G06F 7/04 (2006.01)
G06F 21/57 (2013.01)
G06F 21/10 (2013.01)
H04L 29/06 (2006.01)
G06F 11/34 (2006.01)

(52) U.S. Cl.
CPC ........... *G06F 21/577* (2013.01); *H04L 63/1433* (2013.01); *G06F 11/3476* (2013.01); *G06F 21/10* (2013.01); *G06F 11/3438* (2013.01)
USPC .............................................. 726/26; 726/30

(58) Field of Classification Search
None
See application file for complete search history.

(56) References Cited

U.S. PATENT DOCUMENTS

| | | | |
|---|---|---|---|
| 7,287,011 B1 * | 10/2007 | Wood et al. ................... | 705/65 |
| 7,590,630 B2 * | 9/2009 | Richter ........................ | 1/1 |
| 7,917,963 B2 * | 3/2011 | Goyal et al. .................. | 726/29 |
| 2002/0143858 A1 * | 10/2002 | Teague et al. ................ | 709/203 |
| 2005/0188318 A1 * | 8/2005 | Tamir et al. .................. | 715/744 |
| 2006/0141985 A1 * | 6/2006 | Patel et al. ................... | 455/410 |
| 2006/0161626 A1 * | 7/2006 | Cardina et al. ............... | 709/206 |
| 2006/0206462 A1 * | 9/2006 | Barber ......................... | 707/3 |
| 2007/0027929 A1 * | 2/2007 | Whelan ....................... | 707/200 |
| 2007/0143827 A1 * | 6/2007 | Nicodemus et al. .......... | 726/2 |
| 2008/0126478 A1 * | 5/2008 | Ferguson et al. ............. | 709/203 |
| 2008/0235362 A1 * | 9/2008 | Kjesbu et al. ................ | 709/223 |
| 2009/0178144 A1 * | 7/2009 | Redlich et al. ............... | 726/27 |
| 2009/0210702 A1 * | 8/2009 | Welingkar et al. ........... | 713/156 |
| 2010/0037321 A1 * | 2/2010 | Oz et al. ...................... | 726/24 |
| 2010/0251340 A1 * | 9/2010 | Martin et al. ................ | 726/4 |
| 2011/0047594 A1 * | 2/2011 | Mahaffey et al. ............ | 726/1 |
| 2011/0225656 A1 * | 9/2011 | Gruper et al. ................ | 726/25 |
| 2011/0320562 A1 * | 12/2011 | Lane et al. ................... | 709/217 |

OTHER PUBLICATIONS

Czajkowski, "Application Isolation in the JavaTM Virtual Machine", OOPSLA '00, Oct. 2000, Minneapolis, Minnesota, USA, pp. 354-366.*
Engels, "The Networked Physical World System", IADIS International Conference WWW/Internet 2002, pp. 104-111.*

* cited by examiner

*Primary Examiner* — Andrew Nalven
*Assistant Examiner* — Walter Malinowski
(74) *Attorney, Agent, or Firm* — Scully, Scott, Murphy & Presser, P.C.

(57) ABSTRACT

A method and system for mobile information security protection may include extracting, by a first processor, identification information corresponding to a plurality of applications installed on a mobile device, sending the extracted identification information to a server, matching, by a second processor, the identification information to information stored in a database storage, receiving matched information from the database storage as a result of matching the identification information, sending the matched information to the mobile device, and presenting the matched information to a user of the mobile device.

13 Claims, 6 Drawing Sheets

| NUMBER | PROCESS NAME | BRIEF DESCRIPTION |
|---|---|---|
| 1 | kernel_task | Kernel |
| 2 | syslogd | System Log |
| 3 | notification_pro | System Notification |
| 4 | location | Location service |
| 5 | MobileSafari | Safari |
| 6 | MobilePhone | Call |
| 7 | MobileMail | Mail Service |
| 8 | MobileSMS | Short Message |
| 9 | AppStore | Appstore |
| 10 | Weather | Weather service |

FIG. 3

| APPLICATION IDENTIFIER | PRIVACY RELATED RISK | EVALUATION |
|---|---|---|
| Net.qihoo.360safe | Access to hardware ID | Yes |
| | Access location information | Yes |
| | Access contacts information | Yes |
| | Access photos or videos | Yes |

FIG. 4a

| ITEM | DETAILS |
|---|---|
| 6 applications can access hardware ID | Click to see the list of application evaluations |
| 5 applications can access location information | Click to see the list of application evaluations |
| 7 applications can access contacts information | Click to see the list of application evaluations |
| 6 applications can access photos or videos | Click to see the list of application evaluations |

METHOD AND SYSTEM FOR MOBILE INFORMATION SECURITY PROTECTION

BACKGROUND

1. Field of Invention

The present invention relates to the field of mobile security, more particularly, to method and system for information security protection from mobile applications.

2. Discussion of Related Art

With the increasing popularity of mobile devices (e.g., smart telephones and other such wireless devices), more users are utilizing their mobile devices to access more and more different types of services over the Internet. For example, there is a trend towards allowing users to interact with banking services and/or networking sites using mobile devices. However, numerous security concerns arise when a user accesses the Internet using a mobile device. In particular, some websites may include malware and/or spyware which may be configured to capture confidential and/or sensitive information/data stored on and/or entered through a mobile device.

Privacy protection becomes more and more important, as computing power of mobile devices is now as powerful as laptops. There are two primary challenges that affect the security strategy of mobile devices. The first challenge is that the speed of software development for mobile devices is far beyond the speed of PC software. Every week, thousands of mobile applications are developed by individual or small developer group, and upload to on-line application store, such as, App Store or Android Market. Applications range from on-line banking, on-line shopping to Social Networking Services, and most of them requires private information more or less, it would be difficult to identify which one is safe or malicious. Existing mobile security software try to solve this matter by continuously monitoring and analyzing behavior of other installed applications. However, such monitoring and analyzing is very time consuming, or simply based on user's subjective decision, such as, which application is trustful or not. It would be often too late when certain privacy risky behavior is detected by the mobile device, and the user's subjective decision is often not accurate enough.

The second challenge is that security apps for mobile devices are expensive to develop and often ineffective. Unlike the PC world, which is dominated by Microsoft, there are several different mobile operating systems—Apple iOS, Android, Windows Mobile, Blackberry, Symbian, etc. Each platform has its own software development environment and a security vendor developing mobile security applications will have to replicate the effort across various platforms. Further, some platforms such as Apple iOS do not allow traditional anti-virus applications on their platform. Loading third party applications, not approved by the platform vendor may lead to violation of contract and often requires "jail-breaking" the device—definitely not an enterprise option. Even if security applications are allowed, they are a headache to deploy, require constant updates, and are easy to circumvent—the user can simply uninstall them if they dislike it. Worst of all, they impact device performance and degrade user experience by stretching the already limited processor and memory resources on the mobile device.

SUMMARY

Aspects and embodiments of the present disclosure provide technical solutions to solve or eliminate the problems discussed above. A first aspect of the invention is directed to a method for mobile information security protection. The method comprises extracting, by a first processor, identification information corresponding to a plurality of applications installed on a mobile device, sending the extracted identification information to a server, matching, by a second processor, the identification information to information stored in a database storage, receiving matched information from the database storage as a result of matching the identification information, sending the matched information to the mobile device, and presenting the matched information to a user of the mobile device.

A second aspect of the invention is directed to a system for mobile information security protection. The system comprises a local end comprising an information collecting module for extracting identification information corresponding to a plurality of applications installed on a mobile device, a local communication module for sending the extracted identification information to a server and receiving data from the server and a display module for presenting information received from the server to an user of the mobile device. The system further comprises a server end comprising a server communication module for receiving data from the mobile device and for sending data to the mobile device, and a comparator module for matching the identification information to information stored in a database.

Other aspects and features of the present invention, as solely defined by the claims, and additional advantages of the invention will become apparent to those skilled in the art upon reference to the following non-limited detailed description taken in conjunction with the provided figures.

BRIEF DESCRIPTION OF THE DRAWINGS

The disclosure is illustrated by way of example and not intended to be limited by the figures of the accompanying drawings in which like references indicate similar elements and in which.

It is noted that the drawings are not to scale.

DETAILED DESCRIPTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

1. System

Figure 1:
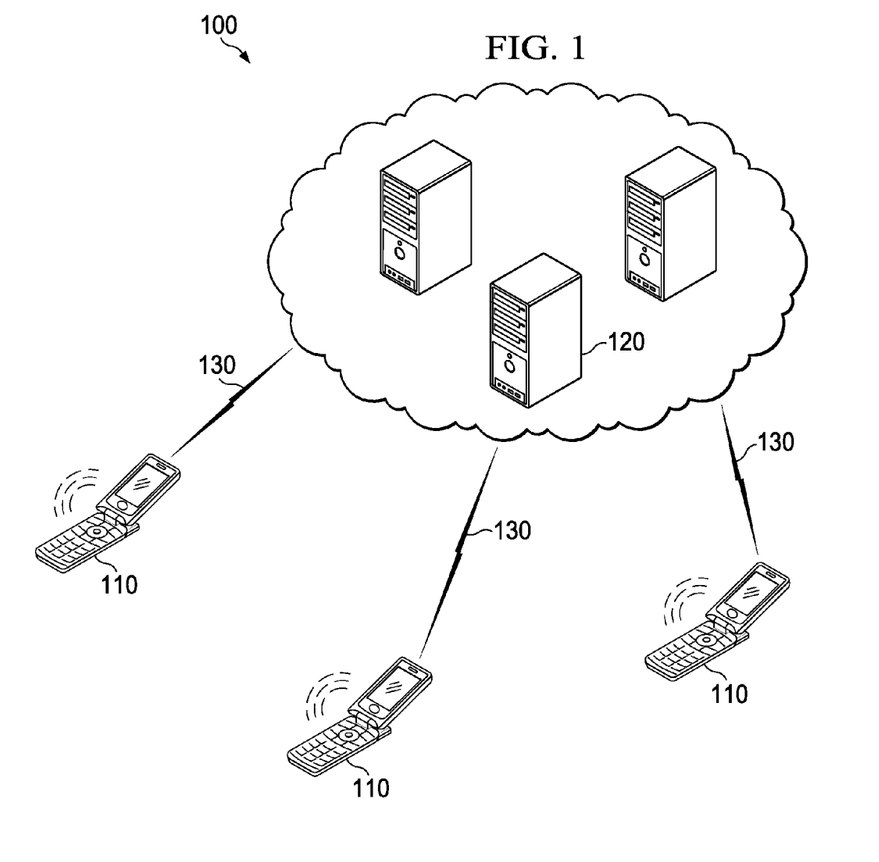
FIG. 1 shows a block diagram of an illustrative system according to an embodiment.

Referring to FIG. 1, a block diagram of an illustrative system 100 is shown. In an embodiment, system 100 includes one or more local ends 110 and a server end 120. The local ends 110 are installed on mobile devices, and server end 120 is installed on a server. The server end 120 communicates with multiple local ends 110 and handles security requests from local ends 110 on basis of cloud computing. The local end 110 and the server end 120 communicate through an external network 130. External network 130 may be a mobile data service on the 2G and 3G cellular communication systems global system for mobile devices, such as but not limited to, GPRS, CDMA1X, WCDMA, etc.

Figure 2:
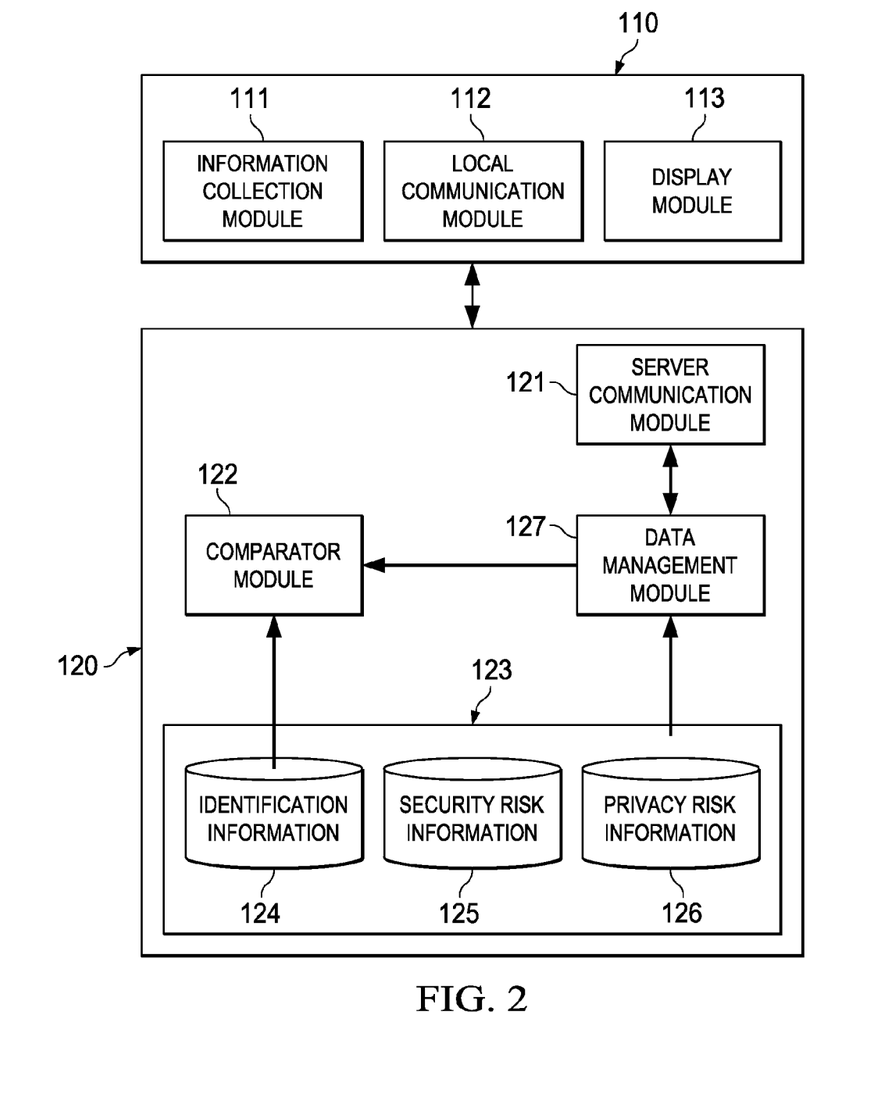
FIG. 2 shows an embodiment of the system for mobile information security protection according to an embodiment.

Referring to FIG. 2, local end 110 includes an information collection module 111, a local communication module 112 and a display module 113. Information collection module 111 communicates with the operating system of the mobile device, extracting the identification information of all programs installed on the mobile device. For example, in Apple's mobile operating system (ISO), extracting a list of bundle identifiers of the applications currently running on the mobile device. The list can be read by using a variable, "sysctl", which can access kernel process "kinfo_proc" at runtime and thereby acquiring process IDs from an IOS data achieve kp_proc.p_comm. Information collection module 111 also integrated the list into a table in XML format.

Figure 3:
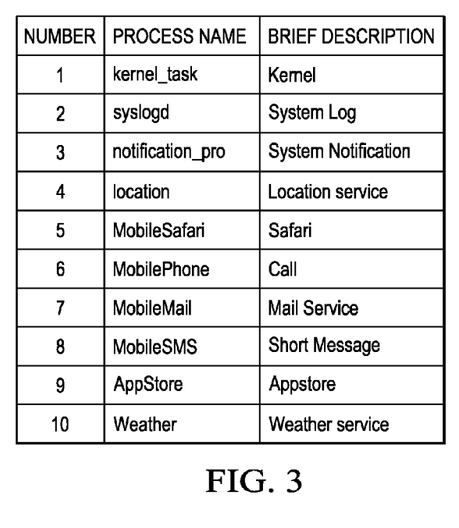
FIG. 3 shows an illustrative example of application identification information collected from a mobile device according to an embodiment.

As shown in FIG. 3, a fragment of the table of application identifications is demonstrated as an example. The first column includes item sequence numbers. The second column includes process names corresponding to applications that are currently running on the mobile device. The third column includes a brief description of the process.

Referring to FIG. 2, the local communication module 112 communicates with the information collection module 111 and the mobile device hardware. The local communication module 112 receives the list of identifiers from the information collection module 111. The list of identifiers is sent to the server end 120 through the mobile device hardware. The sending process may include coding the list of bundle identifiers and transferring the list, for example over HTTP protocol, through the external network to the desired address of server end 120.

Server end 120 may be implemented by one or more computers and communication devices, e.g. server computers, gateways, switches, etc. Referring to FIG. 2, server end 120 includes a server communication module 121, a comparator module 122, a database 123 and a data management module 127. Server communication module 121 communicates with local end 110 through hardware, such as, server computers, gateways or switches, receiving the list of identifiers from local end 110. Server communication module 121 also communicates with data management module 127, forwarding the list of identifiers to data management module 127. Data management module 127 communicates with server communication module 121, comparator module 122 and database 123. Data management module 127 extracts each individual application identifier from the list of identifiers and sending the application identifier to comparator module 122. In an embodiment, the data management module 127 uses micro processor of a server computer to process the extracting of the list of identifier. Comparator module 122 communicates with data management module 127 and database 123. Comparator module 122 receives the application identifier and matches the identifier with the identifiers stored in the database 123. In an embodiment, the comparator module 122 uses micro processor of a server computer to implement the matching process. Results of the matching process will be sent to the data management module 127. If the identifiers are matched, data management module 127 copies the information included in the corresponding package and stores the package. In an embodiment, data management module 127 may use a RAM or hard drive of the server computer to store the copy of packages. Data management module 127 may extract and send each of the individual application identifier to the comparator module 122 for matching. Data management module 127 collects and compiles the copy of the packages into a report. The report may be in XML format, based on the transmission protocol between the server end 120 and local end 110. Data management module 127 may send the report to the server communication module 121. The server communication module 121 forward the report to the local end 110. The server end 120 may transmit data to the local end 110 by using HTTP protocol. Display module 113 receives the report in XML format, presents in a proper table that can be used in a user interface.

Figure 4A:
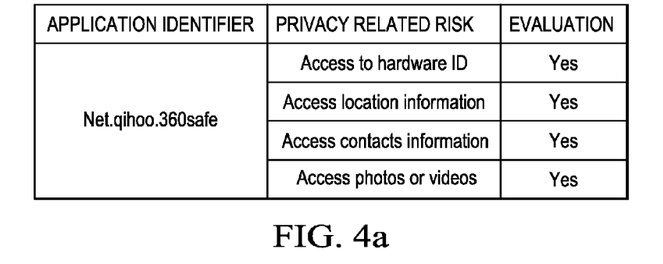
FIG. 4a shows an illustrative example of risk evaluation information corresponding to a mobile application according to an embodiment.

According to an embodiment, the database 123 may store packages for a plurality of mobile applications, and each package includes a table about privacy related evaluations for the application. As shown in FIG. 4a, the table includes a column listing a bunch of privacy related risk for evaluation, such as "Access to hardware ID," "Access location information," "Access contacts information" and "Access photos or videos."

Figure 4B:
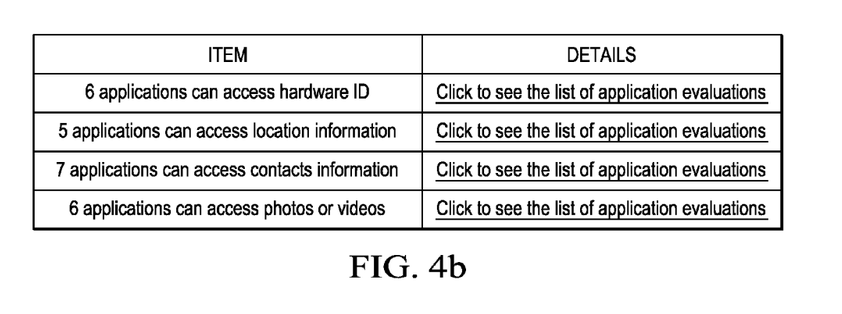
FIG. 4b shows an illustrative example of security report according to an embodiment.

According to an embodiment, the report compiled and created by data management module 127 is in XML format. As shown in FIG. 4b, a table report includes classified information and hyperlinks to each category of information. The table report includes two columns, one column lists items corresponding to statistics of privacy risks, e.g. "6 applications can access hardware ID" or "5 applications can access location information." Another column includes hyperlinks to detailed information for each listed item.

It should be understood that the present invention is not limited to privacy protection and data stored in each package may include other mobile security risk evolution, for example, "access system files", "delete file", "rename file", "silent connecting" or "background installation," etc.

The display module 113 of the local end 110 communicates with the mobile device and the local communication module 112. The display module 113 provides a user interface for the local end 110. The report list can be presented to mobile users, when the report list is received from the server end 120 through the local communication module 112. In an embodiment, the mobile device include a touch screen and the display module 113 also provides an input interface for users to access the functionality of the local end 110 and the report list. For example, the users can access a detailed privacy risk item through clicking the hyperlink at a touch screen to see which application may have a certain kind of privacy risk.

2. Operation Methodology

Figure 5:
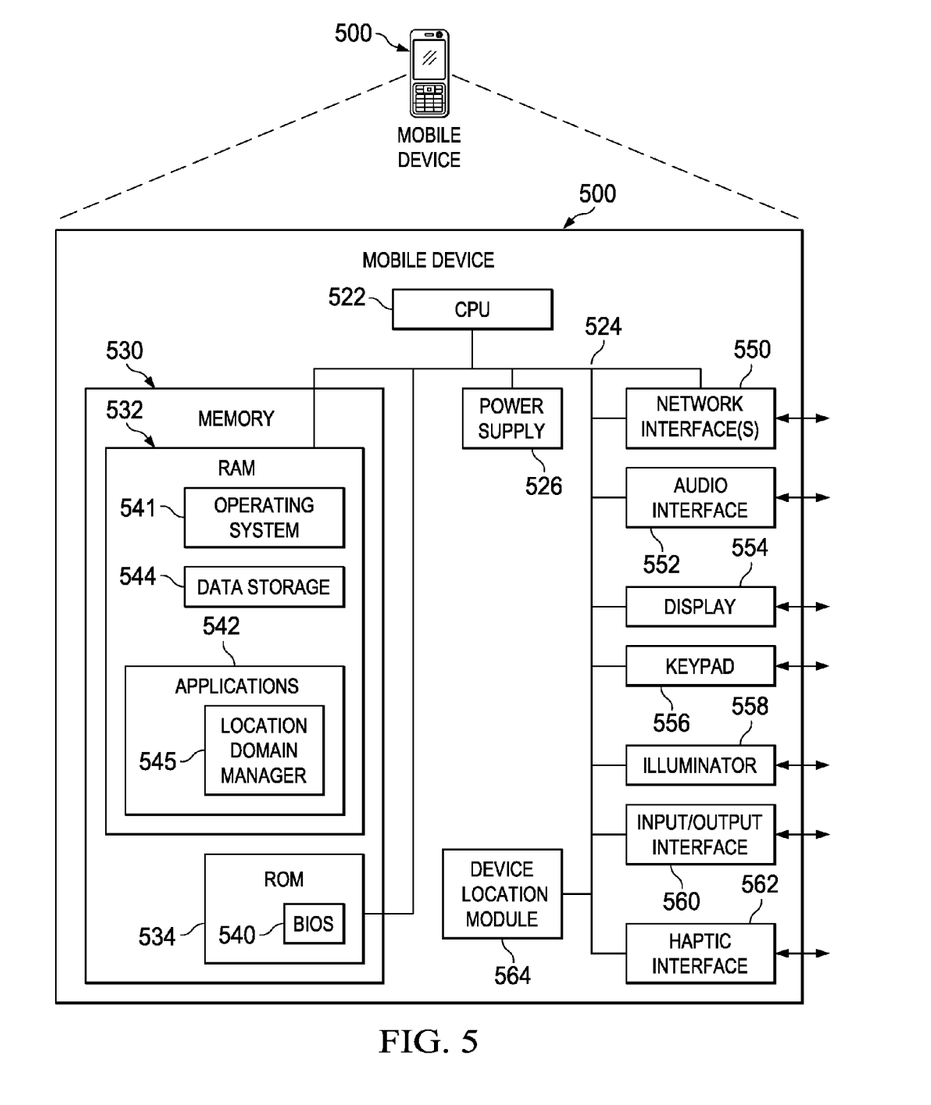
FIG. 5 shows an illustrative example of a mobile device for implementing the process according to an embodiment.

FIG. 5 shows one illustrative example of a mobile device 500 for implementing the process of the invention according to an embodiment. Mobile device 500 may include many additional or fewer components than those shown in FIG. 5. Mobile device 500 may represent, for example, mobile devices 110 of FIG. 1. As shown, mobile device 500 includes a central processing unit (CPU) 522 in communication with a mass memory 530 via a bus 524. Mobile device 500 also includes a power supply 526, one or more network interfaces 550, an audio interface 552, a display 554, a keypad 556, an illuminator 558, an input/output interface 560, a haptic interface 562, and a device location module 564. Power supply 526 provides power to the mobile device 500. A rechargeable or non-rechargeable battery may be used to provide power. The power may also be provided by an external power source, such as an AC adapter or a powered docking cradle that supplements and/or recharges a battery.

Mobile device 500 may optionally communicate with a base station (not shown), or directly with another computing device. Network interface 550 may include circuitry for coupling mobile device 500 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless application protocol (WAP), ultra wide band (UWB), IEEE 802.16 Worldwide Interoperability for Microwave Access (WiMax), session initiation protocol/real-time transport protocol (SIP/RTP), or any of a variety of other wireless communication protocols. Network interface 550 is sometimes known as a transceiver, transceiving device, or network interface card (NIC).

Audio interface 552 is arranged to produce and receive audio signals such as the sound of a human voice. For example, audio interface 552 may be coupled to a speaker and microphone (not shown) to enable telecommunication with others and/or generate an audio acknowledgement for some action. Display 554 may be a liquid crystal display (LCD), gas plasma, light emitting diode (LED), or any other type of display used with a computing device. Display 554 may also include a touch sensitive screen arranged to receive input from an object such as a stylus or a digit from a human hand.

Keypad 556 may comprise any input device arranged to receive input from a user. For example, keypad 556 may include a push button numeric dial, or a keyboard. Keypad 556 may also include command buttons that are associated with selecting and sending images. Illuminator 558 may provide a status indication and/or provide light. Illuminator 558 may remain active for specific periods of time or in response to events. For example, when illuminator 558 is active, it may backlight the buttons on keypad 556 and stay on while the client device is powered. Also, illuminator 558 may backlight these buttons in various patterns when particular actions are performed, such as dialing another client device. Illuminator 558 may also cause light sources positioned within a transparent or translucent case of the client device to illuminate in response to actions.

Mobile device 500 also comprises input/output interface 560 for communicating with external devices, such as a headset, or other input or output devices not shown in FIG. 5. Input/output interface 560 can utilize one or more communication technologies, such as USB, infrared, BLUETOOTH™, or the like. Haptic interface 562 is arranged to provide tactile feedback to a user of the client device. For example, the haptic interface may be employed to vibrate mobile device 500 in a particular way when another user of a computing device is calling.

Figure 6:
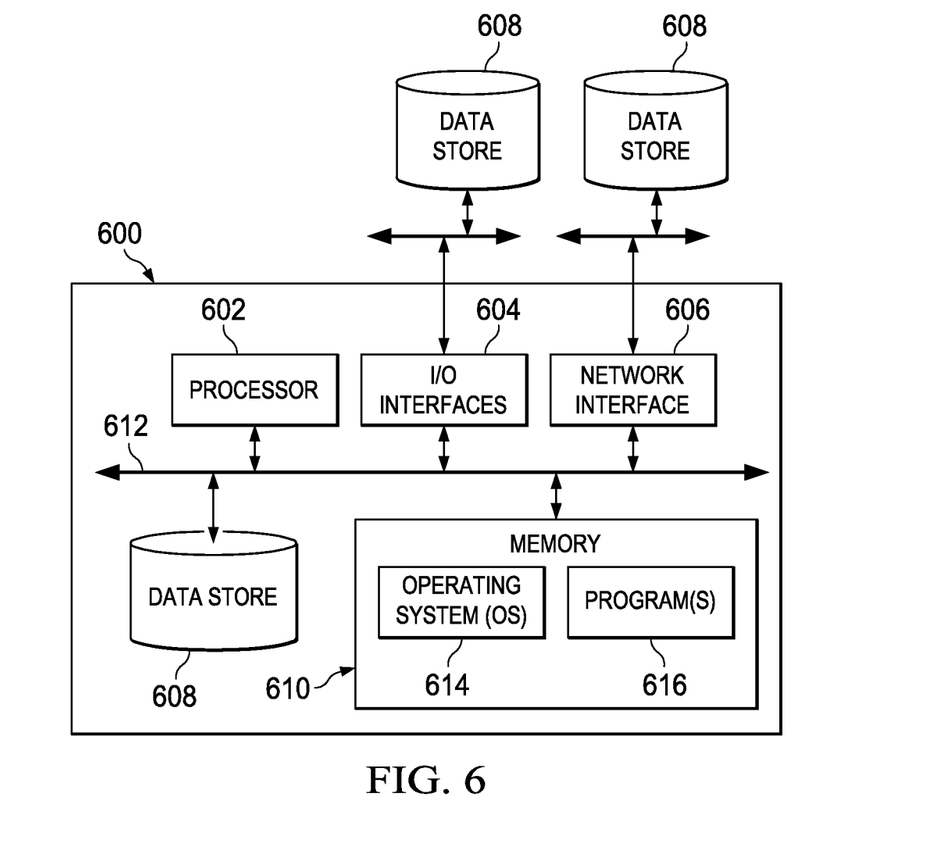
FIG. 6 shows an illustrative example of a server for implementing the process according to an embodiment.

Referring to FIG. 6, in an exemplary embodiment, a block diagram illustrates a server 600 which may be used in the system 100 or standalone. The server 600 may be a digital computer that, in terms of hardware architecture, generally includes a processor 602, input/output (I/O) interfaces 604, a network interface 606, a data store 608, and memory 610. It should be appreciated by those of ordinary skill in the art that FIG. 6 depicts the server 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 may be, for example but not limited to, one or more buses or other wired or wireless connections, as is known in the art. The local interface 612 may have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 may be any custom made or commercially available processor, a central processing unit (CPU), an auxiliary processor among several processors associated with the server 600, a semiconductor-based microprocessor (in the form of a microchip or chip set), or generally any device for executing software instructions. When the server 600 is in operation, the processor 602 is configured to execute software stored within the memory 610, to communicate data to and from the memory 610, and to generally control operations of the server 600 pursuant to the software instructions. The I/O interfaces 604 may be used to receive user input from and/or for providing system output to one or more devices or components. User input may be provided via, for example, a keyboard, touch pad, and/or a mouse. System output may be provided via a display device and a printer (not shown). I/O interfaces 604 can include, for example, a serial port, a parallel port, a small computer system interface (SCSI), an infrared (IR) interface, a radio frequency (RF) interface, and/or a universal serial bus (USB) interface.

The network interface 606 may be used to enable the server 600 to communicate on a network, such as the Internet, and the like. The network interface 606 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 606 may include address, control, and/or data connections to enable appropriate communications on the network. A data store 608 may be used to store data. The data store 608 may include any of volatile memory elements (e.g., random access memory (RAM, such as DRAM, SRAM, SDRAM, and the like)), nonvolatile, non-transitory memory elements (e.g., ROM, hard drive, tape, CDROM, and the like), and combinations thereof. Moreover, the data store 608 may incorporate electronic, magnetic, optical, and/or other types of storage media. In one example, the data store 608 may be located internal to the server 600 such as, for example, an internal hard drive connected to the local interface 612 in the server 600. Additionally in another embodiment, the data store 608 may be located external to the server 600 such as, for example, an external hard drive connected to the I/O interfaces 604 (e.g., SCSI or USB connection). In a further embodiment, the data store 608 may be connected to the server 600 through a network, such as, for example, a network attached file server.

The memory 610 may include any of volatile memory elements (e.g., random access memory (RAM, such as DRAM, SRAM, SDRAM, etc.)), nonvolatile, non-transitory memory elements (e.g., ROM, hard drive, tape, CDROM, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 may include one or more software programs, each of which includes an ordered listing of executable instructions for implementing logical functions. The software in the memory 610 includes an operating system (O/S) 614 and one or more programs 616. The operating system 614 essentially controls the execution of other computer programs, such as the one or more programs 616, and provides scheduling, input-output control, file and data management, memory management, and communication control and related services. The operating system 614 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), or the like. The one or more programs 616 may be configured to implement the various processes, algorithms, methods, techniques, etc. described herein.

Figure 7:
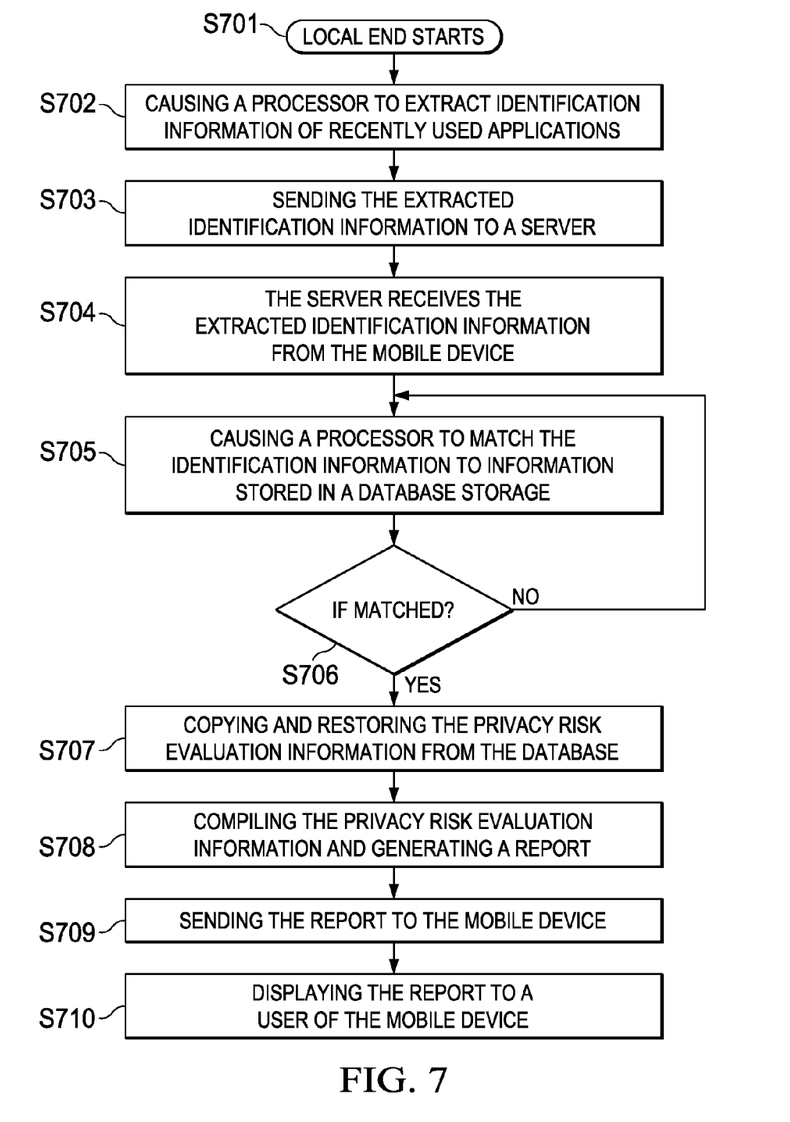
FIG. 7 shows a flowcharts and block diagrams depicting a process according to an embodiment.

FIG. 7 shows one illustrative example of a method for mobile information security protection. The method starts at step S701, in which the local end is started. The local end comprises functional modules that may be started manually by a user through an interface of the mobile device, e.g. input/output interface 560 or haptic interface 562. It should be understood that the local end may also be started automatically when the mobile device hardware starts. At step S702, identification information of all currently running applications is extracted. The extracting process may be implemented by the CPU 522 of the mobile device. For example, the CPU 522 reads the identifier of all applications currently running on the mobile device, e.g. using a variable, "sysctl", which can access kernel process "kinfo_proc" at runtime and thereby acquiring process names from an IOS data achieve kp_proc.p_comm. In addition, the identifiers are compiled and integrated into an XML format by CPU 522 and stored in data storage 544 of RAM 532. At step S703, the extracted identification information is sent to a server. The sending process may be controlled by CPU 522 and transmitted through network interface 550 to external network.

At step S704, the server 600 receives the extracted identification information from the mobile device. The server 600 may receive the identification information from external network through network interface 606, and may store the identification information in data storage 608. At step S705, the identification information of each mobile application is matched to information stored in a database. The matching process may be implemented through processor 602, and the database may be included in the internal data store 608 or external data store 608. The database includes identification information, security or privacy evaluation related information, as well as other information that is shown, for example, in FIG. 4a.

At step S706, according to the determination of the matching process, if the application identification matches, to the method proceeds to step S706; and if none of the data in the database matches the application identification, the method proceeds to step S705 and the next application identifier for matching is used.

At step S707, the privacy risk evaluation information from the database is copied and restored in memory 610 for further processing. At step S708, when all of the application identifier received from the mobile device 500 have been matched, the privacy risk evaluation information corresponding to different application identifiers are compiled and integrated into a report, for example in XML format. According to an embodiment, step S708 may further comprises summarizing and classifying the privacy risk evaluation information. For example, for all applications being matched, how many of them may access hardware ID, how many of them may access location information, etc. Details corresponding to each class or category of risk may be connected through hyperlink, e.g. a list of names or identifiers of the applications under a class or category.

At step S709, the report generated at step S708 is sent to the mobile device 500 through the network interface 606. At step S 710, mobile device receives the report through network interface 550 and displays the report to mobile device users through display 554.

While shown and described herein as a method and system for mobile information security protection, it is understood that the invention further provides various additional features. For example, in an embodiment, the invention provides a program product stored on a computer-readable medium, which when executed, enables a computer infrastructure to provide mobile information security protection. To this extent, the computer-readable medium includes program code, such as program code stored on the local end 110 (FIG. 2), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 530 (FIG. 5) and/or data storage 544 (FIG. 5), and/or as a data signal traveling over a network (e.g., during a wired/wireless electronic distribution of the program product).

In addition, a method for mobile information security protection can be included. In this case, a computer infrastructure, such as server computer system 600 (FIG. 6), can be obtained (e.g., created, maintained, having been made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as server computer 600 (FIG. 6), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to exemplary embodiments thereof, it will be understood by those of ordinary skilled in the art that various changes in form and details may be made therein without departing from the spirit and scope of the present invention as defined by the claims. In addition, those of ordinary skill in the art appreciate that any arrangement which is calculated to achieve the same purpose may be substituted for the specific embodiments shown and that the invention has other applications in other environments.

What is claimed is:

1. A system for mobile information security protection, the system comprises:
    a local end comprising:
        an information collecting module executing at a central processing unit (CPU) of a mobile device, the information collecting module operable for extracting identification information corresponding to a plurality of applications installed on a mobile device;
        a local communication module executing at the CPU of the mobile device, the local communication module operable for sending the extracted identification information to a server and receiving a security report of the mobile phone from the server; and
        a display module executing at the CPU of the mobile device, the display module operable for presenting information received from the server to an user of the mobile device;
    a server end comprising:
        a server communication module for receiving the extracted identification information from the mobile device and for sending the security report to the mobile device; and
        a comparator module for matching the extracted identification information to information stored in a database;
        wherein the database includes a plurality of information packages, each information package corresponding to each of the plurality of applications,
        wherein the plurality of information packages in the database further includes security risk information of the plurality of applications,
        wherein the security report is generated based on the security risk information associated with at least one application in the matched information, and
        wherein the security report comprises a collection of applications on the mobile device which can access hardware ID, a collection of applications on the mobile device which can access location information, a collection of applications on the mobile device which can access contacts information, and a collection of applications on the mobile device which can access photos or videos.

2. The system of claim 1, wherein each of the information packages includes at least one of the extracted identification information and privacy risk information associated with each application in a corresponding package.

3. The system of claim 1, wherein the server end further includes a data management module being configured to extract identification information of each application and forward the extracted identification information to the comparator module.

4. The system of claim 3, wherein the data management module is configured to copy and store the information included in a plurality of information packages, each information package corresponding to each application, as a result of the comparator module matching the extracted identification information.

5. The system of claim 4, wherein the data management module is configured to compile and generate the security report.

6. The system of claim 5, wherein the server communication module is configured to send the security report to the mobile device.

7. The system of claim 1, wherein the information collecting module is configured to collect and arrange multiple application identifications executed on the mobile device.

8. A method for mobile information security protection, the method comprising:
    extracting, by a first processor executing at a central processing unit (CPU) of a mobile device, identification information corresponding to a plurality of applications installed on the mobile device;
    sending the extracted identification information to a server;
    matching, by a second processor, the identification information to information stored in a database storage, wherein the database storage includes a plurality of information packages, each information package corresponding to each of the plurality of applications, and the plurality of information packages in the database storage further includes security risk information of the plurality of applications;
    receiving matched information from the database storage as a result of matching the identification information;
    compiling and generating a security report of the mobile device based on the security risk information associated with at least one application in the matched information;
    sending the security report to the mobile device;
    presenting the security report to a user of the mobile device; and wherein the security report comprises a collection of applications on the mobile device which can access hardware ID, a collection of applications on the mobile device which can access location information, a collection of applications on the mobile device which can access contacts information, and a collection of applications on the mobile device which can access photos or videos.

9. The method of claim 8, further comprising storing at least one of the extracted identification information, and privacy risk information associated with each application in a corresponding package.

10. The method of claim 8, further comprising extracting identification information from each application and forwarding the extracted identification information to the server for matching.

11. The method of claim 8, further comprising copying and storing the information included in a package in a memory, as a result of matching the extracted identification information.

12. The method of claim 11, wherein the security report is further compiled and generated based on privacy risk level information associated with each application in a corresponding package.

13. The method of claim 8, further comprising extracting the identification information corresponding to the plurality of applications executed on the mobile device.

* * * * *